Jan. 24, 1967 J. F. FRIDDELL Re. 26,145
METHOD OF AND APPARATUS FOR CONVERTING A DIESEL ENGINE TO OPERATE ON NATURAL GAS
Original Filed March 18, 1964
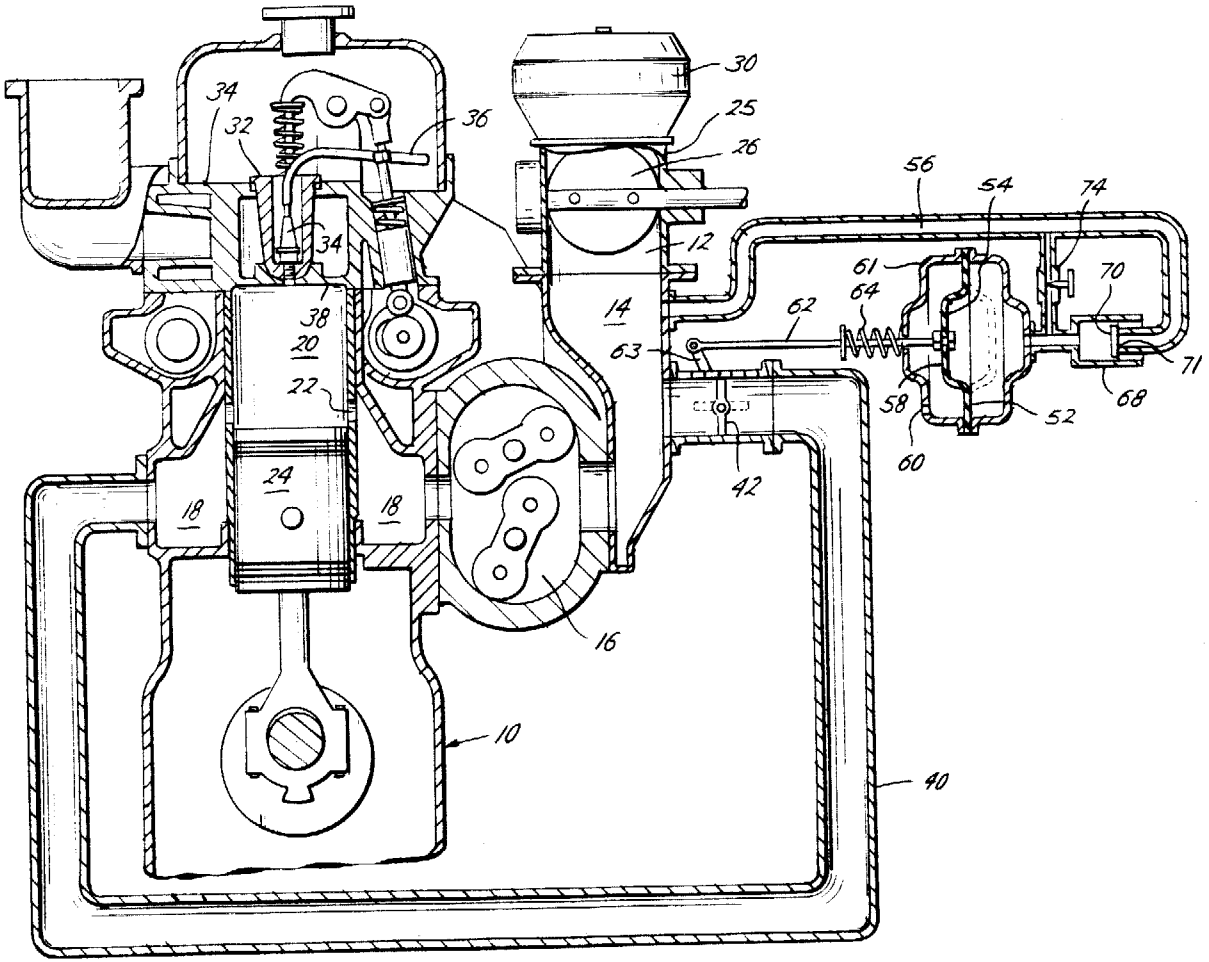
James F. Friddell
INVENTOR.
BY James A. Weiler
Jefferson D. Gilliam
William G. Stout
Paul L. DeVenter II
ATTORNEYS United States Patent Office Re. 26,145
Reissued Jan. 24, 1967

26,145

METHOD OF AND APPARATUS FOR CONVERTING A DIESEL ENGINE TO OPERATE ON NATURAL GAS

James F. Friddell, Houston, Tex., assignor to Stewart & Stevenson Services, Inc., Houston, Tex., a corporation of Texas Original No. 3,187,728, dated June 8, 1965, Ser. No. 352,738, Mar. 18, 1964. Application for reissue Jan. 14, 1966, Ser. No. 526,941
8 Claims. (Cl. 123—32)

Matter enclosed in heavy brackets [ ] appears in the original patent but forms no part of this reissue specification; matter printed in italics indicates the additions made by reissue.

This application is a continuation-in-part of my copending application Serial No. 211,275, filed July 20, 1962, for Diesel Engine Conversion Method, now abandoned.

The present invention relates to a method of and an apparatus for converting a diesel engine to operate on natural gas, and more particularly relates to a method of and apparatus for converting a multicylinder, two cycle, blower scavenged, diesel engine to operate on natural gas over variable ranges of the speeds and loads.

Many diesel fuel engines are being operated adjacent supplies of gaseous fuel or at least operating in locations where the cost of gaseous fuels are less than diesel fuel. Therefore, it would be advantageous to convert a diesel operating engine so as to operate on a low cost gaseous fuel supply such as natural gas or L.P.G. In converting a diesel engine to operate on a gaseous fuel the fuel injectors are replaced with spark plugs which are connected to a suitable ignition system, and a carburetor is placed on the air intake. This simple type of conversion will work satisfactorily on engines which are to be operated at single loads and single speeds as the necessary air-fuel ration can be suitably set but will not work satisfactorily on a blower scavenged diesel over varying loads and speeds. A positive displacement scavenging blower provides a considerable amount of air in excess of the requirement needed for combustion of a gaseous fuel, particularly at reduced loads. Therefore, in order to maintain the proper air to fuel ratio necessary for successful operation in a spark ignited gas burning engine at reduced loads, the intake of the mixture of fuel and air is reduced. This is done by restricting the intake, usually with a butterfly valve in the carburetor. This creates an unusually high vacuum condition at no load or partial load operation which increases fuel consumption, increases lube oil consumption and causes high friction loading of the positive displacement scavenging blower.

It is a general object of the present invention to provide a method of and an apparatus for converting a two cycle blower scavenged diesel engine to operate with a less expensive gaseous fuel.

It is therefore an object of the present invention to provide an improvement in the method of and apparatus for converting a diesel engine to gaseous fuel operation by decreasing the compression ratio of the engine, replacing the diesel fuel injectors with spark plugs and connecting a suitable gaseous fuel carburetor to the air inlet of the diesel engine by providing partial recirculation of the air-fuel mixture from the blower outlet or air box back to the blower intake manifold during periods of decreased load on the engine.

Yet a still further object of the present invention is the provision of a method of and apparatus for improving the conversion of a diesel fuel engine to operate on a gaseous fuel by partial recirculation of the air-fuel mixture through a recirculating passageway controlled by valve means which opens and closes the passageway in response to the vacuum pressure in the blower intake manifold.

A still further object of the present invention is the provision of a method of and apparatus for converting a diesel engine to a gaseous fuel operated engine by providing a recirculating duct having a valve controlling the opening and closing of said duct wherein a diaphragm is provided exposed to the blower intake manifold for opening the duct when a vacuum is created in the manifold, a check valve between the diaphragm and said manifold to insure the quick closing of said recirculating duct when the engine load increases, and a time delay valve between said diaphragm and the blower intake manifold to provide a time delay in which to burn and remove the large quantity of air-fuel mixture in the engine intake prior to opening the recirculating ducts on the occurence of a decreased load.

Other and further objects, features and advantages will be apparent from the following description of a presently preferred embodiment of the invention, taken in conjunction with the accompanying drawing in which like character references designate like parts throughout the several views and where, The drawing is an elevational view, partly in cross section, illustrating the conversion of a two cycle blower scavenged diesel engine into a gaseous fuel operated engine.

Referring now to the drawing, the diesel engine of the present invention which is converted to operate on a gaseous fuel is generally indicated by the numeral 10. In a conventional two cycle, blower scavenged diesel engine, such as for example the General Motors Series 71 diesel, air is drawn through air inlets 12 and passed to the blower intake manifold 14, passed through the positive displacement scavenger blower 16 to the air box 18 and then into one of the cylinders 20 through the inlet ports 22. Thus, when the pistons 24 move below and open the ports 22, the air from the blower 16 is forced into the cylinders 20. While not shown, the conventional diesel engine will have diesel fuel lines leading to an injector at the top of each cylinder 20. Thus, when air is drawn into the cylinders 20 and highly compressed, the injector will inject diesel fuel into the cylinder for firing.

The present invention is directed to modifying a conventional two cycle blower scavenged diesel engine in order to operate it on a lower cost gaseous fuel such as natural gas or butane. Generally, to accomplish this conversion, the diesel fuel injectors are removed and replaced with spark plugs which are suitably connected to an ignition system such as an electrical distributor or magneto (not shown). The combustion space in the cylinder 20 is increased such as by boring the cylinder head or by the use of spacer plates to lower the compression ratio. A suitable carburetor 25 having a conventional butterfly valve 26 is mounted between the diesel air inlet 12 and the air filter 30 to pass the gaseous fuel and air mixture into the blower intake manifold 14.

A spark plug mounting adapter 32 having a spark plug 34 may be substituted for each of the diesel fuel injectors in the cylinder head 34 above each of the cylinders 20. A suitable ignition wire 36 is connected to each of the spark plugs 34 and to a suitable ignition system (not shown) such as a battery distributor or a magneto for providing the electrical spark to the spark plugs.

Of course, it is desirable to increase the combustion space in the engine so as to reduce the compression ratio. This may be accomplished by boring the cylinder head 34 above each of the cylinders 18 or by the use of spacer plates (not shown) to provide a recess 38 to lower the compression ratio of the engine so that it will be suitable for use with gaseous fuel.

A suitable carburetor 25 is mounted on the air inlet 12 of the diesel engine 10. Thus, suitable control linkage (not shown) is connected to and controls the butterfly valve 26 of the carburetor 25 and may if desired be connected to a conventional engine governor (not shown).

In diesel operations, air flow is practically unrestricted and varies only in proportion to engine speed. How ever, in a carburetor spark ignition engine, it is necessary to maintain a proper air-fuel ratio throughout the engine's operating range. The air-fuel ratio is generally controlled by the carburetor 25 through a butterfly valve 26. However, when carbureting a two cycle blower scavenged diesel engine the blower which is a positive displacement engine driven unit supplies air in proportion to its speed and thus under certain operating conditions furnishes a volume of air in excess of the requirement for combustion. Thus, a two cycle blower scavenged engine when connected to a mixing chamber or carburetor necessary for use in burning natural gas and using spark ignition, creates an unusually high vacuum condition at no load or partial load operation. The reason for this is that in order to maintain the proper air to fuel ratio which is necessary for successful operation in a spark ignited gas burning engine, at reduced loads on the engine the intake of the mixture of fuel and air must be reduced. This is normally done by restricting the intake with a butterfly valve in the carburetor. However, restriction in the intake passage acts against the positive displacement blower on the diesel engine and creates a high vacuum and consequently heat due to the high velocity and friction of air passing through the restricted carburetor opening. In addition to the heat caused by the restriction, the engine parasitic load created as a result of having to produce its own power to rotate its own scavenging blower is increased as the butterfly valve closes for partial or no load operation thereby creating an additional load on the blower. Thus, the engine efficiency is decreased, the correct air to fuel ratio is difficult to maintain and lube oil is pulled through the blower seals into the cylinders by the vacuum created by the blower with the result that it has not been possible to convert a two cycle diesel engine to gaseous operation to operate over variable speeds with variable loads.

Therefore, the present invention is directed to providing a recirculation duct or passageway 40 from the air box 18, which is pressurized by the blower 16, back to the blower intake manifold 14. A suitable valve 42 is provided in the passageway 40 for opening, closing or throttling the recirculation passageway 40. At full load operation, the recirculating passageway 40 is not needed as all the air drawn in through the carburetor 26 by the blower 16 will be needed for the proper air-fuel ratio. Therefore, the valve 42 will be closed. However, at reduced loads the intake of the air-fuel mixture must be reduced. Thus, the butterfly valve 26 in the carburetor 25 will be closed restricting the intake passageway. But this restriction in the intake passageway to the positive displacement blower 16 creates a high vacuum in the blower intake manifold 14. It is at the condition of decreased loads where it is desirable to open the valve 42 and allow the blower to partially recirculate the air-fuel mixture about the passageway 40. Thus, a diaphragm 52 is provided in which its side 54 is in fluid communication with the blower intake manifold 14 through line 56. The second side 58 of the diaphragm 52 is vented to the atmosphere through suitable openings 60 in the diaphragm housing 61. A rod 62 is secured to the diaphragm 52 and movable therewith to pivotally operate a lever 63 which in turn operates the valve 42. Normally, spring 64 yieldably acts against the housing 61 and rod 62 to keep the valve 42 in a closed position until vacuum is applied to the face 54 of the diaphragm 52 to overcome the spring 64 and thus open the valve 42.

In communication between side 54 of the diaphragm and the blower intake manifold 14 are two valves arranged in parallel. First, a check valve 68 is provided which closes when a vacuum is applied to line 56 by moving valve element 70 over the valve seat 71. The check valve 68 allows the converted engine to quickly respond to increases in loads on the engine when the butterfly valve 26 opens decreasing the vacuum in the manifold 14 thus relieving the pressure against the side 54 of the diaphragm through the check valve 68 to allow spring 64 to close the valve 42 and the recirculating duct 40.

The second valve is a time delay valve 74 which may be of a conventional needle type valve for restricting the line a desired amount whereby any vacuum in the manifold 14 may be applied to the side 54 of the diaphragm 52 to actuate the valve 42 to an open position, but only after a suitable time delay. The reason for the time delay is that the air box 18 and intake manifold will have a large quantity of fuel at high loads which should be disposed of prior to opening the recirculating passageway 40. Therefore a short time delay is provided on decrease in load before the diaphragm 52 will react and open the passageway 40.

In operation, at maximum load the carburetor butterfly valve 26 will be in a wide open position. Because the butterfly valve 26 is in the open position the vacuum in the blower intake manifold 14 and in the line 56 will be at a maximum and thereby the spring 64 will expand and override the vacuum force acting on side 54 of the diaphragm 52 to move rod 62 and lever 63 in a direction to close valve 42 in the recirculation passageway 40. Thus, the full intake of air-fuel mixture enters the blower 16 from the intake manifold 14, flows to air box 18 and through ports 22 into the cylinders 20 when the pistons 24 move to uncover the port 22. Thus, it is noted that at maximum load the recirculation feature is inoperative.

On reducing the load on the engine the carburetor butterfly valve 26 partially closes restricting the intake passageway 12 to the positive displacement blower 16 which results in an increased blower intake manifold 14 vacuum which is communicated to line 56 and keeps check valve 68 closed. However, simultaneously the vacuum exerts a force through time delay 74 on side 54 of the diaphragm 52. The force on the diaphragm side 54 gradually builds up after the time delay (which may be approximately 3–4 seconds from maximum load to no load) and the diaphragm 54 moves to the right as shown in the drawing overcoming the return spring 64 until the force of the vacuum or negative pressure balances the force of the spring. The movement of the diaphragm carries the rod 62 and lever 63 in a direction to open the recirculating valve 42 and allow recirculation of part of the air-fuel mixture from the blower outlet at the air box 18 back to the blower intake manifold 14. Thus, the excess air created by the positive displacement blower 16 is recirculated without providing the extreme high vacuum in the intake manifold 14 with its many disadvantages. The amount of opening of the recirculating valve 42 is adjusted by means of the spring 64 preferably so that at loads just below the rated load or horsepower the recirculating valve 42 is just beginning to open. Therefore, the recirculating valve 42 is completely closed at any load on the engine above rated horsepower and assures a sufficient air-fuel mixture and air box pressure for all loads above rated. The time delay valve 74 is to allow the engine time to burn the large quantity of air-fuel mixture which has been mixed at higher loads prior to the reduction in load.

As the engine load further decreases the carburetor butterfly valve 26 closes further and the vacuum of the blower intake manifold 14 further increases to position the diaphragm 54 in a direction to further open the recirculating valve 42 and allow a greater volume of air-fuel mixture to recirculate thereby lowering the blower load and reducing the air box pressure to a value that more nearly meets the requirement of the engine at that particular load. Thus, the recirculating passageway reacts for each decrease in load on the engine until the recirculating valve 42 is completely open and the load on the engine is approximately ⅓ rated load. Therefore, the diaphragm 52 continuously monitors the blower intake manifold 14 pressure to correct the recirculated air-fuel mixture on even small load changes.

However, it is to be noted that when the load increases on the engine the butterfly valve 26 opens, and the vacuum pressure in the manifold intake 14 decreases and the pressure change is transmitted through line 56 in a direction to open check valve 68 thereby bypassing the time delay valve 74 to allow a quick closing of valve 42 to provide quick recovery of engine speed and assumption of the increased load.

It is believed that the method of the invention is apparent from the foregoing description of a presently preferred apparatus of the invention. The method, however, comprises the improvement in the method of converting a diesel engine to operate on natural gas wherein the diesel injectors are replaced with spark plugs which are connected to an ignition system, a carburetor is placed on a diesel air inlet and the compression ratio is lowered and on decreased loads on the engine part of the output of the blower is recirculated to the blower intake manifold. The method also comprehends that the partial recirculation occurs on a decrease in load only after a time delay to allow burning up of the quantity of air-fuel mixture which has already been mixed for the heavier load requirement.

The present invention, therefore, is well suited to carry out the objects and attain the ends and advantages mentioned as well as others inherent therein. While a presently preferred embodiment of the invention is given for the purpose of disclosure, numerous changes and details on construction, arrangement of parts and steps to the process may be made which will readily suggest themselves to those skilled in the art and which are encompassed within the spirit of the invention and the scope of the appended claims.

What is claimed is:

1. The method of converting a multicylinder two cycle, blower scavenged diesel engine to operate on natural gas comprising, replacing each diesel injector with a spark plug,
connecting the spark plugs to an ignition system,
placing a carburetor on the diesel air inlet,
lowering the compression ratio of the diesel engine, and
recirculating part of the blower output to the blower input when the engine load decreases.

2. In the method of converting a multicylinder two cycle, blower scavenged diesel engine to operate on natural gas wherein the diesel injectors are replaced with spark plugs which are connected to an ignition system, a carburetor is placed on the diesel air inlet and the compression ratio of the diesel engine is lowered, the improvement comprising, recirculating part of the air fuel mixture from the blower output back to the blower input when the load on the engine decreases.

3. The invention of claim 2 wherein the recirculation occurs only after a time delay.

4. The method of converting a multicylinder two cycle, positive displacement scavenging blower diesel engine to operate on natural gas comprising, replacing the diesel injectors with spark plugs,
connecting the spark plugs to an ignition system, placing a natural gas carburetor on the diesel air intake, and
during periods of decreased loads partially recirculating the air fuel mixture from the blower output back to the blower input,
but providing said partial recirculation only after a time delay thereby burning the large quantity of fuel which has already been mixed during the period of increased load.

5. An apparatus for converting a multicylinder two cycle, blower scavenged diesel engine to operate on natural gas wherein the diesel injectors have been replaced with spark plugs and which have been connected to an ignition system and a carburetor has been placed on the diesel air inlet comprising, a recirculation passageway connected between the blower inlet and the blower outlet, and
valve means controlling the opening and closing of said passageway.

6. The invention of claim 5 wherein the valve means is controlled by the vacuum pressure in the blower intake manifold.

7. An apparatus for converting a multicylinder two cycle, positive displacement scavenging blower diesel engine to operate on natural gas wherein the diesel injectors are replaced with spark plugs and are connected to an ignition system the compression ratio is lowered and a natural gas carburetor is connected to the air inlet comprising, a recirculating duct connected between the blower output and the blower intake manifold,
a valve opening and closing said duct,
a diaphragm connected to and controlling said valve, said diaphragm being in communication with the blower intake manifold,
a check valve between said diaphragm and said intake manifold allowing the passage of gas toward said diaphragm but preventing passage of gas from the diaphragm towards the manifold, and
a time delay valve positioned between the diaphragm and said manifold.

*8. In a multicylinder two cycle, positive displacement blower engine having a blower intake and blower output, the combination of a fuel recirculation means comprising,*

*a recirculating duct connected between the blower output and the blower intake,*
*a valve for opening and closing said duct,*
*a diaphragm connected to and controlling said valve, said diaphragm being in communication with the blower intake,*
*a check valve between said diaphragm and said intake allowing the passage of gas toward said diaphragm but preventing passage of gas from the diaphragm towards the intake, and*
*a time delay valve positioned between the diaphragm and intake and in parallel with the check valve for restricting the passage of gas from the diaphragm to the intake thereby delaying the opening of said recirculating duct on a decrease in load.*

References Cited by the Examiner

The following references, cited by the Examiner, are of record in the patented file of this patent or the original patent.

UNITED STATES PATENTS

| | | | |
|---|---|---|---|
| 2,356,379 | 8/1944 | Caris et al. | 123—119 |
| 2,614,546 | 10/1952 | Schwarz | 123—48 |
| 3,077,189 | 2/1963 | Earnshaw et al. | 123—65 |

MARK NEWMAN, *Primary Examiner.*

LAURENCE M. GOODRIDGE, *Examiner.*